United States Patent
Okuda et al.

(10) Patent No.: US 6,190,444 B1
(45) Date of Patent: Feb. 20, 2001

(54) EMULSION INK FOR STENCIL PRINTING

(75) Inventors: Sadanao Okuda; Hiromichi Yamada, both of Inashiki-gun (JP)

(73) Assignee: Riso Kagaku Corporation, Tokyom (JP)

(*) Notice: Under 35 U.S.C. 154(b), the term of this patent shall be extended for 0 days.

(21) Appl. No.: 09/419,887

(22) Filed: Oct. 18, 1999

(30) Foreign Application Priority Data

Oct. 19, 1998 (JP) .................................................. 10/297257

(51) Int. Cl.$^7$ .................................................. C09D 11/02
(52) U.S. Cl. .................................. 106/31.26; 106/31.35; 106/31.4; 106/31.41; 106/31.67; 106/31.72; 106/31.73
(58) Field of Search ............................... 106/31.26, 31.35, 106/31.4, 31.41, 31.67, 31.72, 31.73

(56) References Cited

U.S. PATENT DOCUMENTS

| 5,417,749 | 5/1995 | Krishnan et al. | 106/31.26 |
|---|---|---|---|
| 5,573,578 | * 11/1996 | Okuda | 106/31.26 |
| 5,622,548 | * 4/1997 | Zou et al. | 106/31.25 |
| 5,800,599 | 9/1998 | Asada | 106/31.26 |
| 5,904,759 | * 5/1999 | Okuda et al. | 106/21.26 |
| 5,948,151 | * 9/1999 | Ono et al. | 106/31.26 |

FOREIGN PATENT DOCUMENTS

| 0846737 | 6/1998 | (EP) . |
|---|---|---|
| 61-255967 | 11/1986 | (JP) . |
| 64-14284 | 1/1989 | (JP) . |
| 3-78433 | 12/1991 | (JP) . |
| 4-132777 | 5/1992 | (JP) . |
| 5-117565 | 5/1993 | (JP) . |
| 6-49401 | 2/1994 | (JP) . |
| 6-145576 | 5/1994 | (JP) . |
| 6-145577 | 5/1994 | (JP) . |
| 6-220383 | 8/1994 | (JP) . |
| 6-329970 | 11/1994 | (JP) . |
| 7-150091 | 6/1995 | (JP) . |
| 7-179799 | 7/1995 | (JP) . |

* cited by examiner

*Primary Examiner*—Helene Klemanski
(74) *Attorney, Agent, or Firm*—Pillsbury Madison & Sutro LLP

(57) ABSTRACT

Provided is a water-in-oil (W/O) emulsion ink for stencil printing which is less in change of viscosity with time and can give always stable prints. The emulsion ink contains a resinous component having a free carboxylic acid group or a higher fatty acid in the oil phase, and contains a divalent or trivalent metal salt and a monovalent metal salt having alkalinity in the water phase, whereby an interfacial layer of the emulsion is strengthened to stabilize the emulsion. The resinous component is preferably an alkyd resin, a rosin-modified phenolic resin, a maleic acid resin and a rosin. The monovalent metal salt or the divalent or trivalent metal salt is preferably contained in at least an amount equivalent to the free carboxylic acid of the resinous component and the higher fatty acid contained in the oil phase. The resinous component or the higher fatty acid is contained in an amount of 0.5–30% by weight based on the total amount of the emulsion ink.

7 Claims, No Drawings

EMULSION INK FOR STENCIL PRINTING

The present invention relates to an emulsion ink for stencil printing, and more particularly it relates to an emulsion ink which is less in change of viscosity with time and can stably provide prints of high quality.

Stencil printing comprises perforating a stencil sheet to make a master and passing an ink through the perforated portions to such an article to be printed as printing paper. Since the master can be easily made, the stencil printing is utilized in a wide variety of fields.

Water-in-oil (W/O) emulsion inks are generally used for stencil printing, as disclosed in JP 61-255967 A, JP 64-14284 A, JP 4-132777 A, JP 5-117565A, JP 7-179799A and so on. However, these water-in-oil (W/O) emulsion inks suffer from the problem that their viscosity lowers with lapse of time.

In order to solve the problem, it has been proposed to use some specific surface active agents, for example, use of isostearates of polyhydric alcohols (JP 7-157701 A), use of polyglycerin fatty acid ester emulsifiers (JP 6-145577 A), use of sorbitol esters of saturated or unsaturated fatty acids of 12–24 carbon atoms (JP 6-145576 A), and use of oxyfatty acid esters of polyhydric alcohols selected from polyglycerin, sugars, and sugar alcohols (JP 3-78433 B). It is further proposed to use surface active agents having a specific HLB (JP 6-329970 A, JP 6-220383 A, and JP 6-49401 A). However, none of these proposals can secure sufficient stability of emulsion.

Another proposal is to add a water-soluble magnesium to the water phase of the water-in-oil (W/O) emulsion to improve stability with time of the emulsion (JP 7-150091 A). This method cannot still provide satisfactory stability of the emulsion.

The object of the present invention is to solve the problems in the conventional techniques and, thus, provide an emulsion ink for stencil printing which is less in change of viscosity with lapse of time and can stably provide prints of high quality.

As a result of intensive researches conducted by the inventors, it has been found that stability of emulsion in water-in-oil (W/O) emulsion inks can be markedly improved by containing a resinous component having a free carboxylic acid group, or a higher fatty acid in the oil phase, and containing a divalent or trivalent metal salt and a monovalent metal salt having alkalinity in the water phase. Thus, the present invention has been accomplished.

That is, the present invention relates to a water-in-oil (W/O) emulsion ink for stencil printing, having an oil phase and a water phase, in which the oil phase contains a resinous component having a free carboxylic acid group, or a higher fatty acid, and the water phase contains a divalent or trivalent metal salt and a monovalent metal salt having alkalinity.

According to the present invention, stability of the emulsion of the ink is markedly improved by allowing a resinous component having a free carboxylic acid group or a higher fatty acid to be present in the oil phase and allowing a divalent or trivalent metal salt and a monovalent metal salt having alkalinity to co-exist in the water phase. It is considered that this is because the free carboxylic acid of the resinous component or the higher fatty acid reacts with the divalent or trivalent metal salt in an interfacial layer of the emulsion, namely a portion at which the water phase and the oil phase contact with each other so as to produce a metallic soap, and as a result the interfacial layer becomes strong.

Although not being bound by theory, it is considered that in the ink of the present invention, first an alkali soap is produced by the reaction of the following formula (1), and then a metal soap is produced by the double decomposition reaction of the following formula (2) in which two compounds replace their components with each other to produce two new compounds.

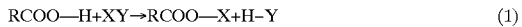
$$RCOO{-}H + XY \rightarrow RCOO{-}X + H{-}Y \qquad (1)$$

in which RCOO—H is a resinous component having a free carboxylic acid group, or a higher fatty acid, XY is a monovalent metal salt having alkalinity, and RCOO—X is an alkali soap.

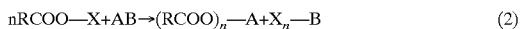
$$nRCOO{-}X + AB \rightarrow (RCOO)_n{-}A + X_n{-}B \qquad (2)$$

in which n is equal to 2 or 3, AB is a divalent or trivalent metal salt where A is a metal, and $(RCOO)_n$—A is a metallic soap.

It is presumed that the metallic soap is produced in the interfacial layer of the emulsion. It is considered that since the carboxylic acid group (—COOH) in the resinous component or higher fatty acid is present in the state of being oriented to the water phase side, it becomes insoluble in water, and thus the reaction of the formula (2) immediately proceeds to produce the metallic soap, and, as a result, the stability of the emulsion is improved.

The emulsion ink for stencil printing of the present invention is prepared, for example, by gradually adding 90–10% by weight of the water phase to 10–90% by weight of the oil phase and emulsifying the mixture.

In the emulsion ink for stencil printing of the present invention, a colorant can be contained in at least one of the oil phase and the water phase. As the colorant, known pigments can be used, and examples thereof for monochromic purpose include carbon blacks such as furnace carbon black, lampblack, acetylene black and channel black, metals such as copper, iron and titanium oxide, and organic pigments such as phthalocyanine pigments, soluble azo pigments, insoluble azo pigments, and quinacridone pigments.

In the emulsion ink for stencil printing of the present invention, the oil phase basically comprises a solvent, an emulsifier, and a resinous component having a free carboxylic acid group, or a higher fatty acid.

The resinous component having a free carboxylic acid group is preferably an alkyd resin, a rosin-modified phenolic resin, a maleic acid resin or a rosin.

As the higher fatty acid, there may be used, for example, oleic acid, isostearic acid, stearic acid, palmitic acid, lauric acid, behenic acid, ricinoleic acid, hydroxyfatty acids, and tall oil fatty acids.

Amount of the resinous component or higher fatty acid is preferably 0.5–30% by weight based on the total amount of the emulsion ink. When the amount is within the above range, a sufficient amount of a metallic soap is produced in the interfacial layer of the emulsion ink, and thus stability of the emulsion can be increased.

As the solvent, a nonvolatile or volatile solvent can be used. The nonvolatile solvent includes, for example, mineral oils such as motor oil, spindle oil, machine oil and liquid paraffin, and vegetable oils such as olive oil, castor oil and salad oil. The volatile solvent includes known solvents of the type of mineral oils and vegetable oils.

The emulsifier to be added to the oil phase is used to form the water-in-oil (W/O) emulsion, and is preferably a non-ionic surfactant. As examples of the surfactant, mention may be made of sorbitan higher-fatty acid esters such as sorbitan monolaurate, sorbitan monopalmitate and sorbitan sesquioleate, fatty acid glycerides such as oleic acid monoglyceride and oleic acid diglyceride, and ethylene oxide adducts of higher alcohols, alkylphenols and fatty acids.

When a colorant is contained in the water phase, the water phase of the ink may contain surfactants for dispersing the colorant or surfactants for forming the oil-in-water (O/W) emulsion. In this case, it is preferred to suitably select the emulsifiers so that the water-in-oil (W/O) emulsion is not destructed by the surfactants.

When the colorant is contained in the oil phase, it is preferred to add a resinous component to the oil phase in order to improve printability. As the resins, there may be used the above-mentioned resinous components such as alkyd resins, rosin-modified phenolic resins, maleic acid resins and rosins and, besides, phenolic resins and petroleum resins.

In the emulsion ink for stencil printing of the present invention, the water phase is basically prepared by dissolving in water the divalent or trivalent metal salt and the monovalent metal salt having alkalinity. The water phase may further contain an oil-in-water (O/W) emulsion of resin or a water-soluble resin to improve the fixation of the colorant. Moreover, the water phase may contain wetting agent, electrolyte and antioxidant.

The divalent or trivalent metal salts include, for example, water-soluble metal salts such as sulfates, nitrates, borates, acetates, phosphates and citrates of calcium, magnesium or aluminum. The divalent or trivalent metal salt is preferably in an equivalent amount or more to the free carboxylic acid groups of the resinous component or higher fatty acid contained in the oil phase. Hereupon, the term "equivalent amount" means an amount of the metal salt necessary to react, in accordance with the formula (2), with all of the free carboxylic acid groups of the alkali soap that has been produced by the formula (1). The amount of the free carboxylic acid groups can be obtained from acid value. Acid value is defined by the amount (mg) of potassium hydroxide required for neutralizing free fatty acids present in 1 g of oils and fats. From the resulting value, amount of the carboxylic acid groups of the fatty acid can be obtained.

The monovalent metal salts can be those which dissolve in water and produce an alkaline solution. Mention may be made of, for example, alkali metal salts such as sodium hydroxide and potassium hydroxide, and, in addition, borax, sodium hydrogencarbonate, disodium hydrogenphosphate, and dipotassium hydrogenphosphate. The monovalent metal salt is preferably in an equivalent amount or more to the free carboxylic acid group of the resinous component or higher fatty acid contained in the oil phase. Hereupon, the term "equivalent amount" means an amount of the metal salt necessary to react with all of the free carboxylic acid groups of the resinous component or higher fatty acid in the above formula (1).

Examples of the oil-in-water (O/W) emulsion of resin include emulsions of resins such as polyvinyl acetate, ethylene-vinyl acetate copolymer, vinyl acetate-acrylate copolymer, polymethacrylates, polystyrene, styrene-acrylate copolymer, styrene-butadiene copolymer, vinylidene chloride-acrylate copolymer, polyvinyl chloride, vinyl chloride-vinyl acetate copolymer, and polyurethane.

Examples of the water-soluble resin include polyvinyl alcohol, methyl cellulose, carboxymethyl cellulose, hydroxymethyl cellulose, polyvinyl pyrrolidone, polyethylene-polyvinyl alcohol copolymer, polyethylene oxide, polyvinyl ether, polyacrylamide, gum arabic, starch, and water-soluble polyurethane.

Amount of the resin emulsion or the water-soluble resin is preferably 1–20% by weight, especially preferably 2–10% by weight in terms of solid content based on the total amount of the emulsion ink. If the amount is less than 1% by weight, the colorant contained in the water phase is not completely fixed on the article to be printed, and if it is more than 20% by weight, inks form a film on perforations of a stencil sheet and become difficult to pass through the perforations when inks are left on the stencil sheet for a long time.

If the resin emulsion or water-soluble resin is one which readily reacts with the metal salt, it is desirable to add the resin emulsion or water-soluble resin to the oil phase separately from the water phase containing the metal salt. For example, the water phase containing the metal salt is added to the oil phase to effect emulsification, and, then, separately therefrom the water phase containing the resin emulsion or water-soluble resin is added to the oil phase to effect emulsification.

The wetting agents include, for example, polyhydric alcohols such as ethylene glycol, sorbitol and glycerin, and polyethylene glycol.

EXAMPLES

The present invention will be explained in more detail by the following examples. In the examples, the term "part(s)" means "part(s) by weight".

Example 1

An emulsion ink for stencil printing was prepared in accordance with the formulation shown in Table 1.

First, carbon black, alkyd resin and a part of No.5 solvent (manufactured by Nippon Oil Co., Ltd.) were dispersed by a three-roll mill to prepare a dispersion. Then, to this dispersion were added the remainder of the No.5 solvent and sorbitan sesquioleate to obtain an oil phase. Separately, water, magnesium sulfate, sodium hydroxide and ethylene glycol were mixed together to obtain a water phase. This water phase was gradually added to the oil phase and emulsification was performed bya high-speed stirrer to obtain a water-in-oil (W/O) emulsion ink for stencil printing of the present invention.

Examples 2–4 and Comparative Examples 1–3

Emulsion inks for stencil printing were prepared in the same manner as in Example 1 in accordance with the formulation shown in Table 1.

Test Examples

The emulsion inks for stencil printing prepared in Examples 1–4 and Comparative Examples 1–3 were left to stand for 3 months at 50° C., and then observed to determine whether destruction of emulsion of the inks occurred or not. The results are shown in Table 1. When no destruction of emulsion and substantially no change of viscosity were observed, this was indicated by "(−)" and when significant destruction or change of viscosity was observed, this was indicated by "(+)".

TABLE 1

| Number of Examples | Ex.1 | Ex.2 | Ex.3 | Ex.4 | C.Ex.1 | C.Ex.2 | C.Ex.3 |
|---|---|---|---|---|---|---|---|
| Oil phase: Free carboxylic acid-containing resinous component or higher fatty acid: | | | | | | | |
| Alkyd resin | 15.0 | 15.0 | — | — | 15.0 | 15.0 | — |
| Rosin-modified phenolic resin | — | — | 10.0 | — | — | — | — |
| Oleic acid | — | — | — | 5.0 | — | — | — |
| Other resinous component: | | | | | | | |
| Petroleum resin | — | — | — | 10.0 | — | — | 12.0 |
| Solvent: | | | | | | | |
| No.5 solvent | 5.0 | 5.0 | 7.0 | 5.0 | 5.0 | 5.0 | 5.0 |
| Emulsifier: | | | | | | | |
| Sorbitan sesquioleate | 3.0 | 3.0 | 3.0 | 3.0 | 3.0 | 3.0 | 3.0 |
| Colorant: | | | | | | | |
| Carbon black | 5.0 | 5.0 | 5.0 | 5.0 | 5.0 | 5.0 | 5.0 |
| Water phase: Divalent or trivalent metal salt: | | | | | | | |
| Magnesium sulfate · 7 $H_2O$ | 1.5 | — | 1.5 | 4.3 | 1.5 | — | 1.5 |
| Aluminum sulfate · 18 $H_2O$ | — | 2.8 | — | — | — | — | — |
| Monovalent metal salt having alkalinity: | | | | | | | |
| Sodium hydroxide | 0.5 | 0.5 | 0.5 | 0.8 | — | 0.5 | 0.5 |
| Wetting agent: | | | | | | | |
| Ethylene glycol | 5.0 | 5.5 | 5.0 | 5.0 | 5.0 | 5.5 | 5.5 |
| Water | 65.0 | 65.0 | 68.0 | 65.0 | 66.0 | 65.5 | 68.0 |
| Total | 100.0 | 101.8 | 100.0 | 103.1 | 100.5 | 99.5 | 100.5 |
| Destruction of emulsion | (−) | (−) | (−) | (−) | (+) | (+) | (+) |

Note:
"Ex." means Example, and "C.Ex." means Comparative Example.

It can be seen from the results of Table 1 that the emulsion inks for stencil printing of the present invention show no destruction of emulsion and substantially no change of viscosity as compared with the inks of comparative examples.

According to the present invention, a resinous component having a free carboxylic acid group or a higher fatty acid is contained in an oil phase of a water-in-oil (W/O) emulsion ink for stencil printing, and a divalent or trivalent metal salt and a monovalent metal salt having alkalinity are contained in a water phase of the ink, whereby a metallic soap is produced in an interfacial layer of the emulsion. As a result, the interfacial layer is strengthened, and an emulsion ink for stencil printing improved in emulsion stability can be obtained.

What we claim is:

1. A water-in-oil (W/O) emulsion ink for stencil printing, having an oil phase and a water phase, in which said oil phase contains a resinous component having a free carboxylic acid group or a higher fatty acid, and said water phase contains a divalent or trivalent metal salt and a monovalent metal salt having alkalinity.

2. An emulsion ink for stencil printing according to claim 1, in which said resinous component having a free carboxylic acid group is at least one selected from the group consisting of an alkyd resin, a rosin-modified phenolic resin, a maleic acid resin and a rosin.

3. An emulsion ink for stencil printing according to claim 1, in which said monovalent metal salt having alkalinity is an alkali metal salt, borax, sodium hydrogencarbonate, disodium hydrogenphosphate or dipotassium hydrogenphosphate.

4. An emulsion ink for stencil printing according to claim 1, in which said divalent or trivalent metal salt is a sulfate, nitrate, borate, acetate, phosphate or citrate of calcium, magnesium or aluminum.

5. An emulsion ink for stencil printing according to claim 1, in which said monovalent metal salt having alkalinity is contained in at least an amount equivalent to the free carboxylic acid group of the resinous component and the higher fatty acid contained in the oil phase.

6. An emulsion ink for stencil printing according to claim 1, in which said divalent or trivalent metal salt is contained in at least an amount equivalent to the free carboxylic acid group of the resinous component and the higher fatty acid contained in the oil phase.

7. An emulsion ink for stencil printing according to claim 1, 2, 5 or 6, in which said resinous component or said higher fatty acid is contained in an amount of 0.5–30% by weight based on the total amount of the emulsion ink.

* * * * *